Oct. 8, 1963

R. S. DITTO 3,106,668

TIMING CIRCUIT

Filed June 29, 1960

INVENTOR.
RICHARD S. DITTO

BY Harry J. McCauley

ATTORNEY 3,106,668

TIMING CIRCUIT

Richard S. Ditto, Newark, Del., assignor to E. I. du Pont de Nemours and Company, Wilmington, Del., a corporation of Delaware Filed June 29, 1960, Ser. No. 39,573
6 Claims. (Cl. 317—148.5)

This invention relates to a timing circuit, and particularly to a timing circuit useful for obtaining time proportioning control of cyclically operating apparatus such as temperature maintaining equipment for heating or cooling, or the like.

Time proportioning control has hitherto generally been effected by the use of timing devices such as motor-driven cams and switch arrangements, or by gas tube relaxation circuits. These solutions to the problem have proved unsatisfactory in long-term reliability, as well as requiring relatively complex apparatus design and being quite limited in the range of regulation time intervals. This and led to the use of an R-C circuit as a time control adjunct to a feedback amplifier, such as taught in U.S.P. 2,838,644; however, there has hitherto been no utilization of a negative feedback loop to enclose both the amplifier and the time control elements, such as R-C circuits, thus compensating not only for variations in amplifier gain but also for variations in supply voltage and time control element parameters.

Figures 1, 1A:
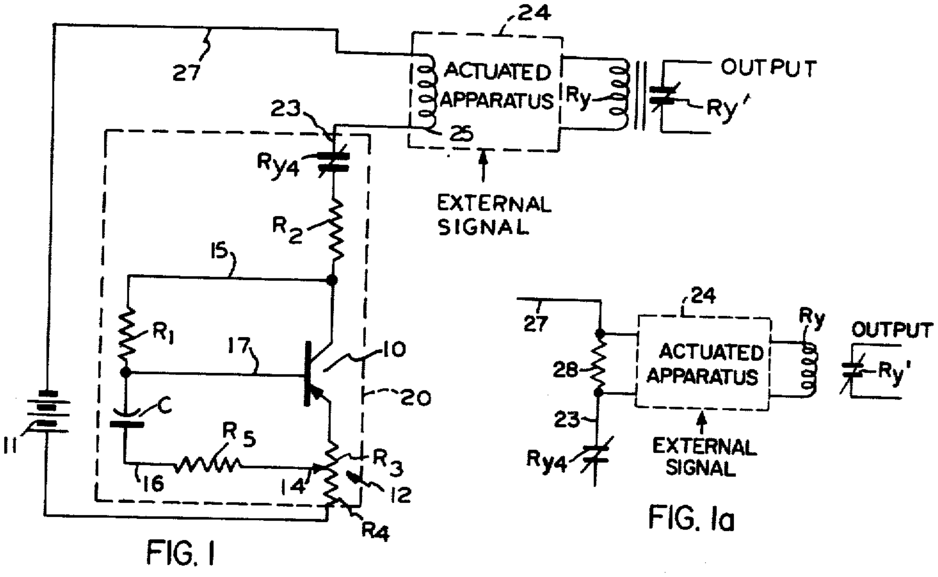
Figure 2:
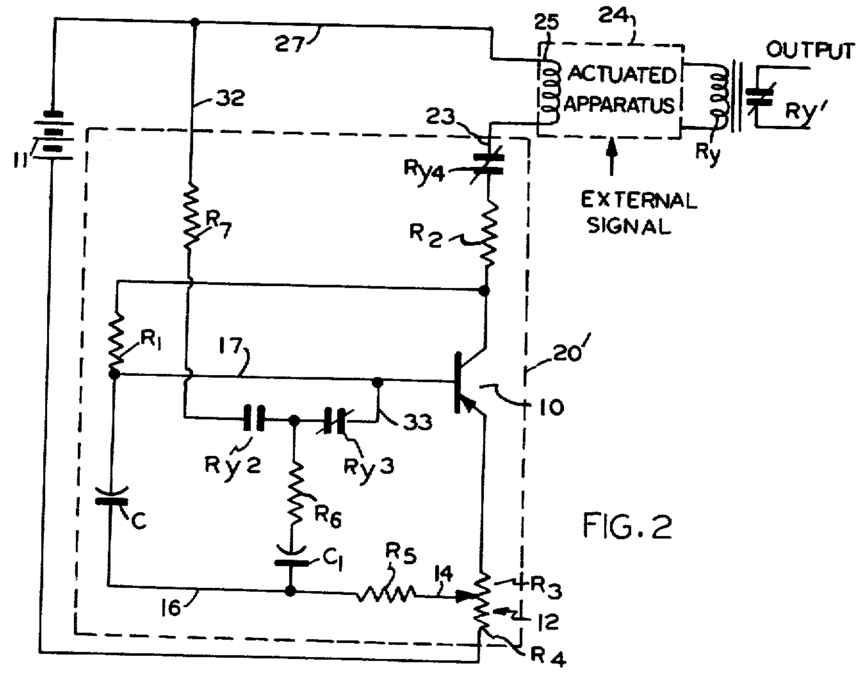

An object of this invention is to provide an improved timing circuit employing negative feedback for the compensation of variation in amplifier gian. Another object is to provide a timing circuit of extremely high reliability and long service life, and one which is relatively economical in first cost and maintenance. Yet other objects of this invention are to provide a timing circuit with a broadened range of control, one which is adapted with slight modification to secure automatically "on" time regulation of the timer circuit as an inverse function of the "off" time of the apparatus controlled by the timing circuit, and a timing circuit which is ideally suited to industrial conditions because of the ruggedness of its design. The manner in which these and other objects of this invention are obtained will become apparent from the detailed description and the drawings, in which:

FIG. 1 is a schematic electrical diagram of a preferred design of timing circuit according to this invention, FIG. 1*a* is a sketch illustrative of a modification applicable to the circuits of FIGS. 1 and 2, and FIG. 2 is a schematic electrical diagram of a second design of timing circuit which is a modification of the circuit of FIG. 1 for the purpose of obtaining a regulation of "on" time of the timer circuit as a preselected inverse function of the "off" time of an apparatus controlled by the timing circuit.

Generally, the timing circuit for apparatus control according to this invention comprises the combination of an electronic amplifying device provided with an output signal lead having an output resistor in series connection therewith and a power supply lead having a potentiometer in series connection therewith, a D.-C. power source for the amplifying device connected at one terminal of said source to the power supply lead on the side of the potentiometer remote from the amplifying device and at the other terminal of said source to the output signal lead and the output resistor by series electrical connection through the control element of the apparatus controlled by the timing circuit, a transient current rate-of-change two element time delay circuit connected in shunt with respect to the amplifying device at a point between the output resistor and the amplifying device on the one hand and the tap of the potentiometer on the other, the electrical characteristics of the two elements of the time delay circuit being chosen to afford a preselected range of time control for the timing circuit, a feedback electrical connection extending from a point between the two elements of the time delay circuit to the electron-flow controlling element of the amplifying device, and a switch actuated by the apparatus controlled by the timing circuit responsive to the on-off states of said apparatus in series electrical connection with said output signal lead of the amplifying device and the power source.

Referring to FIG. 1, which shows a preferred basic embodiment of my timing circuit, the timing circuit per se consists of the circuitry within broken line enclosure 20, which, in this particular version employs a PNP transistor 10 with a current gain of at least 100 as the amplifying device and a D.-C. power source 11 which, typically, may be of 6 to 20 v. magnitude, depending on the type of the transistor utilized. Transistor 10 is in common-emitter type connection with its emitter element connected in series with a potentiometer indicated generally at 12 (typically 1000 ohms, 2 watts), the tap 14 of which is set to divide the resistance thereof into two portions, denoted $R_3$ and $R_4$, respectively. The collector element is in series circuit connection with the output resistor $R_2$ (typically 1500 ohms, 1 watt). The time delay circuit consists of the two elements, charging resistor $R_1$ (typically 150,000 ohms, 1 watt) and capacitor C (typically 250 mfd., 25 v.), series-connected in shunt from a point between $R_2$ and the collector element of transistor 10 by lead 15 to the potentiometer tap 14 via lead 16. $R_5$ is a discharge resistor (e.g., 470 ohms, 1 watt) which is not part of the time delay circuit but is usually incorporated in the tap as a design convenience. Finally, a feedback connection 17 is provided running from a point between the two elements $R_1$ and C of the time delay circuit and the base element of transistor 10. An actuating switch for the timer, which in this design is the set of relay contacts denoted $Ry_4$, is connected in series circuit with load resistor $R_2$ and lead 23 running to the actuated apparatus, indicated generally at 24.

Actuated apparatus 24 can be one of a very wide variety of apparatuses, such as, for example, a magnetic amplifier, transistor amplifier, vacuum tube amplifier, or a relay. For convenience in representation as well as generality of description, the control element thereof is represented simply as a coil 25 through which a control current is obtained for operation of actuated apparatus 24. The control current circuit is completed back to power source 11 through lead 27. An alternative mode of control, usually less preferred, is that portrayed in FIG. 1*a* which employs a voltage signal developed across a resistor 28, to which the same leads of actuated apparatus 24 are connected. In all embodiments of the invention shown, actuated apparatus 24 is represented as obtaining an external signal from an outside sensor, such as a thermistor, thermocouple or the like, as in the typical case of a temperature controller, for example, and the output is delivered to relay coil Ry which operates contacts $Ry'$ in the output circuit as well as $Ry_4$ in the timing circuit.

For specificity of the description of operation, it is assumed that actuated apparatus 24 functions as a temperature controller, which operates cyclically in response to the external signal, the latter turning the actuated apparatus "on," thereby energizing relay Ry which closes relay contacts $Ry_4$ and $Ry'$ to their positions shown in FIG. 1. An electrical current then flows in the circuit denoted "Output," supplying heating or cooling power, as the case may be, to bring the temperature back to the set point. The actuated apparatus is turned "off" by the timing circuit of this invention as a result of the development of a D.-C. current signal of sufficient magnitude which is delivered to coil 25 within a preselected period of time, which immediately de-energizes relay Ry and thus opens both $Ry_4$ and Ry' simultaneously, thereby clearing the way for a repetition of the cycle of operation.

The detailed operation of the timing circuit is as follows. Transistor 10, in the common-emitter circuit in which it is connected, resembles a triode tube wherein the emitter element corresponds generally to the cathode of the tube, the base to the grid and the collector to the plate, except that, with a PNP type transistor such as that described, current flowing in the output circuit is reversed. At the instant in which contacts $Ry_4$ close, substantially the full voltage of power source 11 is applied across charging resistor $R_1$ and capacitor C starts to build up its charge at a rapid rate. However, as charging proceeds, the feedback bias applied through 17 to the base element of transistor 10 increases the flow of current through the transistor. This current divides, so that a small fraction of its passes through $R_1$, as compared to the amount passing $R_2$ at any given time, which possesses the lower resistance value. Accordingly, a progressively lower value of charging voltage is applied to the R-C time delay circuit and the charging rate, while still exponential with time, falls off. Eventually, the current passing through $R_2$ and coil 25 reaches such a high level that actuated device apparatus 24 is switched "off," at which point in time relay contacts $Ry_4$ and Ry' both open, thus removing the collector voltage from transistor 10. The input resistance to the transistor drops to essentially that of $R_3$, and capacitor C at once discharges through $R_3$ and $R_5$, which latter serves a discharge current limiting function.

From the foregoing it will be understood that the time constant of my timing circuit is effected to a very great extent by the operation of transistor 10, thus affording a greatly enlarged range of time regulation. It will be noted also that, since the sum of the resistance values of $R_4$ and $R_5$ is very much smaller than $R_1$ under all circumstances, $R_4$ and $R_5$ have no significant influence on the charging of capacitor C. Nevertheless, the manual setting of potentiometer 12 controls the over-all time selection of the circuit as a whole and has proved completely reliable in operation.

A mathematical analysis of the timing circuit reveals the exponential nature of the current through the collector element of transistor 10 and is helpful to understanding. The following nomenclature is used:

$V_s$=the D.-C. supply voltage of power source 11
$V_c$=the capacitor C charging voltage
$\beta$=the current gain of transistor 10
$I_p$=the charging current of capacitor C
$I_B$=the base current of transistor 10
$I$=the total current through charging resistor $R_1$
$I_c$=the collector current of transistor 10
$S$=the La Place operator
$R_i$=the effective input resistance of transistor 10
$t$=time Since $I_cR_4 << I_cR_2$ $$V_c=V_s-I_cR_2=V_s-I_B\beta R_2=I\left(R_1+\frac{\frac{R_i}{SC}}{R_i+\frac{1}{SC}}\right)$$

where: $I=I_B+I_p$ $$I_p\times\frac{1}{SC}=I_BR_i$$

therefore: $I=I_B(R_iCS+1)$ $$V_c=V_s-I_B\beta R_2=I_B(R_iCS+1)\left(R_1+\frac{R_i}{S_iCS+1}\right)$$

$$I_B=\frac{V_s}{R_1+R_i+\beta R_2}\,\frac{1}{\left(\frac{R_iR_1}{R_1+\beta R_2+R_i}\right)CS+1} \quad (1)$$

The time solution to Equation 1 is:

$$I_B=\frac{V_s}{R_1+R_i+\beta R_2}(1-e^{-\alpha t})$$

where: $I_c=\beta I_B$ $$\alpha_c=\frac{R_1+R_i+\beta R_2}{R_iR_1C}$$

$$R_i=\beta R_3+R_4$$

$$I_c=\frac{V_s\beta}{R_1+R_4+\beta(R_3+R_2)}\left[1-e^{\frac{-(R_1+R_4+\beta(R_2+{}_3)t)}{(R_4+\beta R_3)R_1C}}\right] \quad (2)$$

Consideration of Equation 2 reveals the advantage resident in collector feedback as utilized in this invention, because of the automatic compensation effected for changes in critical circuit parameters such as $R_1$ and $\beta$. Since the objective of the timing circuit is to trigger some actuated apparatus 24 at a predetermined current or voltage level, changes in the time constant (Equation 2) will offset changes in the coefficient term. Thus, there is automatic compensation for the amplifier gain of transistor 10, or its equivalent, making it possible to replace this key element in the timing circuit without objectionable interference with the accurate timing operation of the circuit as a whole.

The time proportioning circuit of FIG. 1 has given good service in installations wherein approximately steady-state load conditions exist. The operation of a control system wherein either the "on" time, or alternatively, the "off" time, is constant is characterized by excursions of the controlled variable above and below the desired set point; however, the magnitude of such excursions can generally be minimized by appropriate controller design. Where the load varies widely, additional provision must be made and the prior art has resorted to variable gain as a function of load, or to manual adjustment to shift the range to match the load imposed on the system. Neither of these solutions has proved entirely satisfactory, and it is an objective of my timing circuit of FIG. 2 to provide a timing apparatus based on the design of FIG. 1 which is capable of automatically effecting compensation for wide variations in load, or other system disturbances. Identical components in both figures are represented by the same reference characters.

Referring to FIG. 2, it will be seen that the basic circuit is in all respects identical with the circuit of FIG. 1, except that there is provided a branch electrical circuit having a lead 32 running from lead 27 to lead 16. This circuit includes, in series connection, charging resistor $R_7$ (typically 150,000 ohms, 1 watt), a set of relay contacts responsive to relay Ry denoted $Ry_2$, a discharge resistor $R_6$ (typically 10,000 ohms, 1 watt) and a capacitor $C_1$ (typically 250 mfd., 25 v.). In addition, the branch circuit is provided with a lead 33 connected between the feedback connection 17 and relay contacts $Ry_2$, provided with a set of relay contacts $Ry_3$ responsive to Ry of a type reversely operating with respect to contacts $Ry_2$, so that one is in closed circuit condition when the other is in open circuit condition (i.e., $Ry_2$ is open when $Ry_3$ is closed, and vice versa). FIG. 2 shows the contact positions taken by all four sets of the relay contacts for the "on" condition of the timing circuit cycle.

In operation, it will be understood that the basic circuit operates in the same manner as already described for the embodiment of FIG. 1; however, now the operation is qualified by the superposed effect of the $R_7$—$C_1$ circuit in the following manner. When relay Ry is de-energized, contacts $Ry_2$ are closed and $C_1$ charges through the branch circuit of lead 32—$R_7$ by application of the full voltage of D.-C. source 11 thereacross. As in a conventional R-C circuit, the voltage across $C_1$ increases exponentially.

When an external signal is applied to actuated apparatus 24, relay Ry is energized, thereupon opening contacts $Ry_2$ and closing contacts $Ry_4$, Ry' and $Ry_3$ as shown in FIG. 2. This places capacitor $C_1$ in parallel with C through discharge resistor $R_6$. Since the initial voltage across C was zero, and $C_1$ stands charged to some finite voltage, current flows from $C_1$ through $R_6$ to C. This results in a precharging of the parallel-connected capacitors, with the result that the timing period of the circuit 20' is decreased by an amount proportional to the voltage existing across $C_1$ when the external signal is applied. Thus, the timing circuit of FIG. 2 provides a timing period which is inversely proportional to the elapsed time between de-energization of relay Ry and the application of the external signal or, expressed in another way, the "on" time of the timing circuit is an inverse function of the "off" time of the actuated apparatus 24 controlled by the timing circuit.

It will be understood that the control signal for actuated apparatus 24 can, in the embodiment of FIG. 2, also be drawn across a resistor 28, if desired, as hereinbefore detailed with respect to FIG. 1*a*.

Although the timing circuit has been described specifically in application to only a single control circuit, it will be understood that it is much more versatile in use. Thus, two timer circuits such as those shown in FIG. 1 can be used in conjunction with one another, each supplying the external signal to the other. Such an arrangement provides adjustable power to a heater in a time-proportioning sense comparable to that obtained with a continuously adjustable voltage transformer. Another application for a single apparatus of the FIG. 1 type is as an interval timer where the external signal is supplied by a manually operated pushbutton or the like. Typical uses for such timers would be in photographic exposure, photodeveloping, photoprinting, or similar activities. Yet another use for either of the timers of FIG. 1 or 2 is in conjunction with a relay, whereby there is provided what amounts to an adjustable time delay relay for which there are, of course, many applications.

It will be understood that inductances can be used to replace capacitances in the time delay circuits of timers according to this invention when the reverse acting nature of the former is taken into account, and it is intended to include both R-C and R-I circuits generically in the phrase "transient current rate-of-change two-element time delay circuit" as used in the claims. Moreover, relay contacts can, of course, be replaced by other types of switch devices known to the art such as transistors, controlled rectifiers, vacuum tubes, and the like. Also, resistors $R_1$, $R_2$ and $R_3$ can be replaced by either transistors or vacuum tubes to provide an additional means for controlling the timing period.

From the foregoing, it will be understood that this invention is subject to relatively wide modification without departure from its essential spirit, and it is intended to be limited only by the scope of the appended claims.

What is claimed is:

1. A timing circuit for the time control of an apparatus provided with a control element comprising in combination an electronic amplifying device provided with an output signal lead having an output resistor in series connection therewith and a power supply lead having a potentiometer in series connection therewith, a D.-C. power source for said amplifying device connected at one terminal of said source to said power supply lead on the side of said potentiometer remote from said amplifying device and at the other terminal of said source to said output signal lead and said output resistor by series electrical connection through said control element of said apparatus controlled by said timing circuit, a transient current rate-of-change two-element time delay circuit connected in shunt with respect to said amplifying device at a point between said output resistor and said amplifying device and the tap of said potentiometer, the electrical characteristics of the two elements of said time delay circuit being chosen to afford a preselected range of time control for said timing circuit, a feedback electrical connection in circuit from a point between said two elements of said time delay circuit to the election-flow controlling element of said amplifying device, and a switch actuated by said apparatus controlled by said timing circuit responsive to the on-off states of said apparatus in series electrical connection with said output signal lead of said amplifying device and said power source.

2. A timing circuit according to claim 1 wherein said transient current rate-of-change two-element time delay circuit is a resistance-capacitance circuit.

3. A timing circuit according to claim 1 wherein said transient current rate-of-change two-element time delay circuit is a resistance-inductance circuit.

4. A timing circuit for the time control of an apparatus provided with a control element comprising in combination an electronic amplifying device provided with an output signal lead having an output resistor in series connection therewith and a power supply lead having a potentiometer in series connection therewith, a D.-C. power source for said amplifying device connected at one terminal of said source to said power supply lead on the side of said potentiometer remote from said amplifying device and at the other terminal of said source to said output signal lead and said output resistor by series electrical connection through said control element of said apparatus controlled by said timing circuit, an R-C circuit connected in shunt with respect to said amplifying device at a point between said output resistor and said amplifying device and the tap of said potentiometer, the values of R and C being chosen to afford a preselected range of time control for said timing circuit, a feedback electrical connection in circuit from a point between the resistor and the capacitor of said R-C circuit to the electron-flow controlling element of said amplifying device, a discharging resistor in series connection with the tap of said potentiometer, and a switch actuated by said apparatus controlled by said timing circuit responsive to the on-off states of said apparatus in series electrical connection with said output signal lead of said amplifying device and said power source.

5. A timing circuit for the time control of an apparatus provided with a control element comprising in combination a transistor connected in common-emitter type connection provided with an output signal lead having an output resistor in series connection therewith connected to the collector element of said transistor and a power supply lead having a potentiometer in series connection therewith connected to the emitter element of said transistor, a D.-C. power source for said transistor connected at one terminal of said source to said power supply lead on the side of said potentiometer remote from said transistor and at the other terminal of said source to said output signal lead and said output resistor by series electrical connection through said control element of said apparatus controlled by said timing circuit, an R-C circuit connected in shunt with respect to said transistor at a point between said output resistor and said transistor and the tap of said potentiometer, the values of R and C being chosen to afford a preselected range of time control for said timing circuit, a feedback electrical connection in circuit from a point between the resistor and the capacitor of said R-C circuit to the base element of said transistor, a discharging resistor in series connection with the tap of said potentiometer, and a switch actuated by said apparatus controlled by said timing circuit responsive to the on-off states of said apparatus in series electrical connection with said output signal lead of said transistor and said power source.

6. A timing circuit according to claim 4 adapted to proportion "on" time of said timing circuit as an inverse function of the "off" time of said apparatus controlled by said timing circuit provided with an electrical branch circuit connected from a point between said control element of said apparatus controlled by said timing circuit and said power source and said tap of said potentiometer on the side of said discharging resistor remote from said potentiometer, said electrical branch circuit being provided with a charging resistor in series connection with a first switch actuated by said apparatus controlled by said timing circuit and a discharging resistor and capacitor, the resistance and capacitance values of which are chosen with reference to the R and C values of said timing circuit to achieve an "on" time for said timing circuit which is a preselected inverse function of the "off" time of said apparatus controlled by said timing circuit, and a second switch actuated by said apparatus controlled by said timing circuit connected to a point in said branch circuit between said first switch and said discharging resistor and said feedback electrical connection, said first switch and said second switch being reversely operating types, so that one is in closed circuit condition when the other is in open circuit condition, and said second switch having an operation in identical sequence with said switch actuated by said apparatus controlled by said timing circuit responsive to the on-off states of said apparatus in series electrical connection with said output lead of said amplifying device and said power source.

References Cited in the file of this patent

UNITED STATES PATENTS 2,835,849 Biedermann et al. ------- May 20, 1958

2,964,625 Brockett ---------------- Dec. 13, 1960

UNITED STATES PATENT OFFICE

CERTIFICATE OF CORRECTION

Patent No. 3,106,668 October 8, 1963

Richard S. Ditto

It is hereby certified that error appears in the above numbered patent requiring correction and that the said Letters Patent should read as corrected below.

Column 1, line 21, for "and" read -- had --; line 31, for "gian" read -- gain --; column 3, line 27, strike out "device"; line 71, the term in the denominator, for "$S_iCS+1$" read -- $R_iCS+1$ --; column 4, line 6, for "$\alpha_c$" read -- $\alpha$ --; column 6, line 3, for "election-flow" read -- electron-flow --.

Signed and sealed this 21st day of April 1964.

(SEAL)

Attest:

ERNEST W. SWIDER — Attesting Officer

EDWARD J. BRENNER — Commissioner of Patents